United States Patent
Schmidt et al.

(10) Patent No.: US 10,341,130 B2
(45) Date of Patent: *Jul. 2, 2019

(54) FAST HARDWARE SWITCHOVER IN A CONTROL PATH IN A NETWORK ASIC

(71) Applicant: Cavium, Inc., San Jose, CA (US)

(72) Inventors: Gerald Schmidt, San Jose, CA (US); Harish Krishnamoorthy, San Jose, CA (US); Tsahi Daniel, Palo Alto, CA (US)

(73) Assignee: Cavium, LLC, Santa Clara, CA (US)

(*) Notice: Subject to any disclaimer, the term of this patent is extended or adjusted under 35 U.S.C. 154(b) by 6 days.

This patent is subject to a terminal disclaimer.

(21) Appl. No.: 15/642,141

(22) Filed: Jul. 5, 2017

(65) Prior Publication Data

US 2018/0102913 A1  Apr. 12, 2018

Related U.S. Application Data

(63) Continuation of application No. 14/494,187, filed on Sep. 23, 2014, now Pat. No. 9,729,338.

(51) Int. Cl.
*H04L 12/28* (2006.01)
*H04L 12/18* (2006.01)

(52) U.S. Cl.
CPC .................. *H04L 12/1863* (2013.01)

(58) Field of Classification Search
CPC ... H04L 12/18; H04L 12/186; H04L 12/1863; H04L 12/28; H04L 12/50; H04L 12/54; H04L 12/761; H04L 12/931; H04L 45/16; H04L 49/201; H04L 49/351; H04L 49/70
See application file for complete search history.

(56) References Cited

U.S. PATENT DOCUMENTS

| | | | |
|---|---|---|---|
| 6,831,917 B1 | 12/2004 | Cheriton | |
| 7,263,099 B1 | 8/2007 | Woo et al. | |
| 7,292,573 B2 | 11/2007 | La Vigne | |
| 7,440,573 B2 | 10/2008 | Lor et al. | |
| 7,724,760 B2 | 5/2010 | Balakrishnan et al. | |
| 7,779,071 B2 | 8/2010 | Lor et al. | |
| 7,796,627 B2 | 9/2010 | Hurley et al. | |
| 8,054,744 B1 | 11/2011 | Bishara et al. | |
| 8,208,418 B1 | 6/2012 | Grosser, Jr. et al. | |
| 8,432,908 B2 * | 4/2013 | Li | H04L 49/90 370/390 |
| 8,599,850 B2 | 12/2013 | Jha et al. | |

(Continued)

OTHER PUBLICATIONS

Parlante, Linked List Basics, downloadable at http://cslibrary.stanford.edu/103/LinkedListBasics.pdf, 26 pages, 2001.

(Continued)

*Primary Examiner* — Frank Duong
(74) *Attorney, Agent, or Firm* — Haverstock & Owens LLP

(57) ABSTRACT

A multicast destination table contains a list of links. The list of links includes the main link that is currently in use and alternate links to reach the same destination. The links in the list of links are ordered based on a metric. Each of the links is stored as an entry in the multicast destination table. A multicast replication engine traverses the list of links until an enabled link in the list of links is reached, and replicates a packet according to data associated with the enabled link in the list of links.

30 Claims, 11 Drawing Sheets

(56) References Cited

U.S. PATENT DOCUMENTS

| | | |
|---|---|---|
| 8,787,373 B2 | 6/2014 | Cors et al. |
| 8,964,742 B1 | 2/2015 | Mizrahi et al. |
| 9,226,308 B2 | 12/2015 | Ketchum et al. |
| 9,241,304 B2 | 1/2016 | Dawson et al. |
| 9,253,043 B2 | 2/2016 | Adolphson |
| 9,331,929 B1 | 5/2016 | Thomas et al. |
| 9,565,136 B2 | 2/2017 | Schmidt |
| 9,582,440 B2 | 2/2017 | Gabbay et al. |
| 9,590,914 B2 | 3/2017 | Alizadeh Attar et al. |
| 9,813,327 B2 | 11/2017 | Schmidt |
| 2001/0039550 A1 | 11/2001 | Putzo |
| 2003/0120806 A1 | 6/2003 | Clune et al. |
| 2004/0107295 A1 | 6/2004 | Herkersdorf |
| 2005/0076228 A1 | 4/2005 | Davis et al. |
| 2006/0045074 A1 | 3/2006 | Lee |
| 2007/0195778 A1 | 8/2007 | Tatar |
| 2008/0141023 A1 | 6/2008 | Qi |
| 2008/0279205 A1 | 11/2008 | Sgouros |
| 2008/0304498 A1 | 12/2008 | Jorgensen |
| 2009/0028045 A1 | 1/2009 | Stellenberg et al. |
| 2010/0318538 A1 | 12/2010 | Wyman |
| 2012/0016845 A1 | 1/2012 | Bates |
| 2012/0134356 A1 | 5/2012 | Groarke et al. |
| 2013/0163475 A1 | 6/2013 | Beliveau |
| 2014/0071988 A1 | 3/2014 | Li |
| 2014/0153443 A1 | 6/2014 | Carter |
| 2014/0181374 A1 | 6/2014 | Ellard |
| 2014/0307579 A1 | 10/2014 | Calo |
| 2015/0124614 A1 | 5/2015 | Alizadeh Attar et al. |
| 2015/0124833 A1 | 5/2015 | Ma et al. |
| 2016/0014018 A1 | 1/2016 | Grosser et al. |

OTHER PUBLICATIONS

Adamchik, Binary Trees, published date Sep. 9, 2013 according to WayBack Machine, 8 pages.

* cited by examiner

N-Tier Linked List

| ptr | evif | mirrorEn | sessionID | nxtPtr |
|---|---|---|---|---|
| 20 | 8 | 1 | 3 | NULL |
| .. | | | | |
| 34 | 10 | 1 | 5 | 38 |
| .. | | | | |
| .. | | | | |
| 38 | 20 | 1 | 1 | NULL |

Multicast Destination Table (MDT)

| ptr | evif | liveEn | live | nxtPtr |
|---|---|---|---|---|
| 20 | 8 | 1 | 1 | 22 |
| .. | | | | |
| 34 | 10 | 1 | 0 | 38 |
| .. | | | | |
| .. | | | | |
| 38 | 20 | 1 | 1 | 40 |

Multicast Destination Table (MDT)

FAST HARDWARE SWITCHOVER IN A CONTROL PATH IN A NETWORK ASIC

RELATED APPLICATIONS

This Application is a continuation of U.S. application Ser. No. 14/494,187, filed on Sep. 23, 2014, and entitled "A FAST HARDWARE SWITCHOVER IN A CONTROL PATH IN A NETWORK ASIC," which is hereby incorporated by reference.

FIELD OF INVENTION

The present invention relates to processing packets. More particularly, the present invention relates to a fast hardware switchover in a control path in a network ASIC.

BACKGROUND OF THE INVENTION

Network switches in the prior art that are able to replicate packets, mirror packets and perform link switchovers, have dedicated circuitry for each of these features. These circuits are dispersed on a network chip. As such, the real estate of the network chip is not efficiently utilized, which can be problematic as additional customer requirements require more functions to be implemented on the network chip.

BRIEF SUMMARY OF THE INVENTION

A multicast destination table contains a list of links. The list of links includes the main link that is currently in use and alternate links to reach the same destination. The links in the list of links are ordered based on a metric. Each of the links is stored as an entry in the multicast destination table. A multicast replication engine traverses the list of links until an enabled link in the list of links is reached, and replicates a packet according to data associated with the enabled link in the list of links.

In one aspect, a network chip is provided. The network chip includes a memory, a multicast destination table stored in the memory and including a list of links, wherein the list of links includes a main link and a plurality of alternative links that reach the same destination, and a multicast replication engine that implements a switchover feature and replicates a packet according to the list of links.

In some embodiments, each of the links is stored as an entry in the multicast destination table. In some embodiments, the entry includes a pointer to the next link in the list of links, destination information, a "first live enabled" field and a "live" field. In some embodiments, the destination information indicates at least one port for local mirroring or at least one tunnel for remote mirroring. In some embodiments, the "first live enabled" field indicates whether the switchover feature is enabled. In some embodiments, the "live" field indicates whether a corresponding link is active. In some embodiments, the multicast destination engine traverses the list of links until the "first live enabled" field and the "live" field of a corresponding entry are enabled. In some embodiments, the packet is replicated when the "first live enabled" field is enabled and the "live" field is enabled.

In some embodiments, the multicast destination table is software configurable.

In some embodiments, the multicast destination table is kept up to date and maintained by software.

In some embodiments, the links in the list of links are ordered based on a metric.

In some embodiments, the switchover feature is network agnostic.

In another aspect, a multicast replication engine is provided. The multicast replication engine includes a circuit configured to receive a packet, traverse a list of links until an enabled link in the list of links is reached, wherein the list of links includes a main link and a plurality of alternative links that reach the same destination, and replicate a packet according to data associated with the enabled link in the list of links.

In some embodiments, the enabled link is the main link. Alternatively, the enabled link is one of the plurality of alternative links.

In some embodiments, the circuit is configured to access a multicast destination table.

In some embodiments, each link of the list of links is stored as an entry in the multicast destination table. In some embodiment, the data includes identification information of a corresponding link, destination information, and a pointer to the next link. In some embodiments, the circuit is further configured to make a copy of the packet with the destination information. In some embodiments, the data includes a "live" bit that indicates that the enabled link is active.

In yet another aspect, a network switch is provided. The network switch includes an input port for receiving a packet, a memory for storing a multicast destination table, wherein the multicast destination table includes a list of links, wherein the list of links includes a main link and a plurality of alternative links that reach the same destination, and a multicast replication engine that replicates the packet according to data associated with a first enabled link in the list of links.

In some embodiments, the first enabled link in the list of links is a link that is active.

In some embodiments, the multicast destination table is software configured at initialization.

In some embodiments, the multicast destination table is software dynamically configured during runtime.

In some embodiments, a method of implementing a network switch is provided. The method includes maintaining a multicast destination table in a memory of the network switch, receiving a packet at an incoming port of the network switch, deriving an entry point into the multicast destination table, wherein the entry point points to the start of a list of links, wherein the list of links includes a main link and a plurality of alternative links that reach the same destination, and replicating the packet according to data associated with a first enabled link in the list of links.

In some embodiments, the first enabled link in the list of links is a link that is active.

In some embodiments, the method further includes, prior to the maintaining step, preconfiguring the multicast destination table via software with entries corresponding to the list of links.

In some embodiments, the method further includes detecting a link failure at one of links in the list of links, and updating a respective entry for the failed link in the multicast destination table.

In some embodiments, the method further includes detecting recovery of a failed link in the list of links, and updating a respective entry for the recovered link in the multicast destination table.

In some embodiments, the method further includes performing a switch over in hardware by changing an outgoing interface of the packet in a control path.

In yet another aspect, a method of implementing a multicast replication engine is provided. The method includes receiving a packet, receiving an entry point into a multicast destination table, wherein the entry point points to the start of a list of links, wherein the list of links includes a main link and a plurality of alternative links that reach the same destination, traversing the list of links until an enabled link in the list of links is reached, and replicating the packet according to data associated with the enabled link in the list of links.

In some embodiments, each link of the list of links is stored as an entry in the multicast destination table.

In some embodiments, the data includes identification information of a corresponding link, destination information, a pointer to the next link. In some embodiments, the packet is replicated with the destination information. In some embodiments, the data includes a "live" bit that indicates that the enabled link is active.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
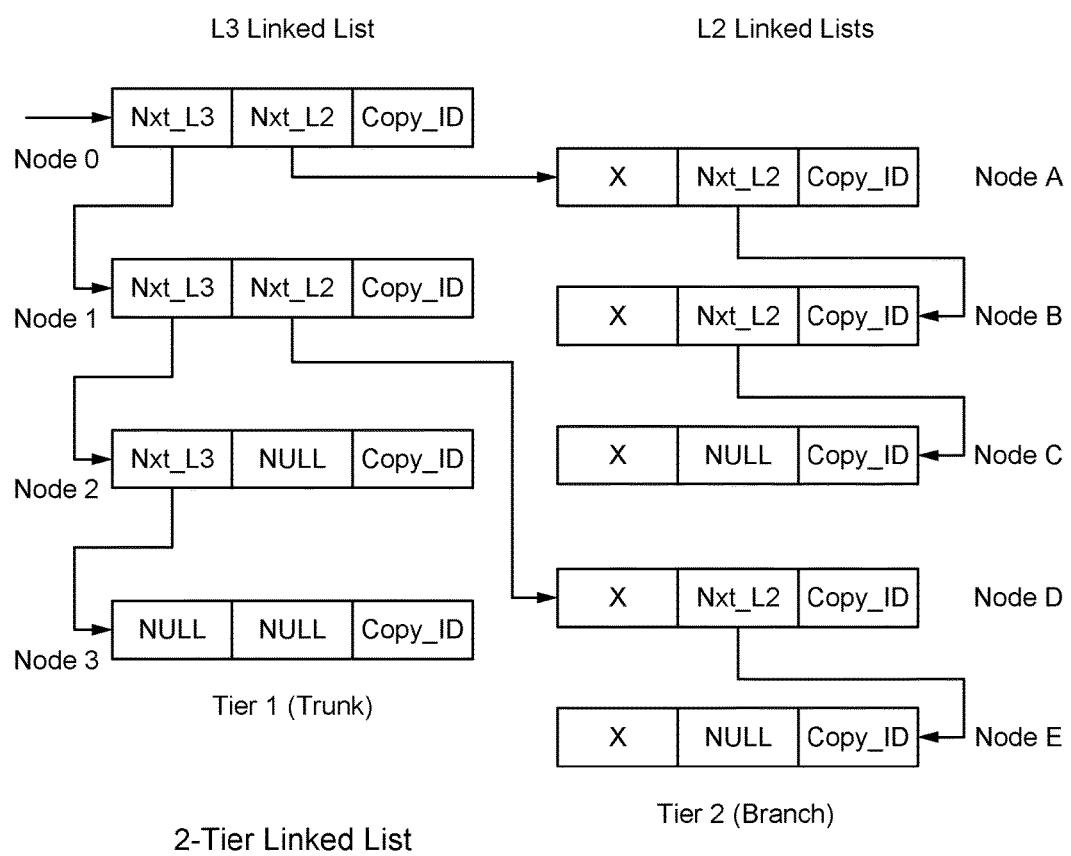
FIG. 1 illustrates an exemplary 2-tier linked list in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

A network device, such as a network switch, is able to switch/route network traffic. The network switch includes at least one input/incoming port and at least one output/outgoing port for receiving and transmitting packets. The network switch also includes a multicast replication engine. Briefly, the multicast replication engine includes a circuit configured to replicate packets, mirror packets and perform link switchovers. Each of these functions is discussed below. The network switch also includes memory to store data used by the network switch. For example, the data includes tables, commands, indexing information and other structures.

Multicast Replication

Network traffic is a mix of unicast and multicast traffic. Unicast traffic is traffic that is meant for a single destination. Multicast traffic is traffic that is meant for a group of destinations. Multicast traffic, thus, requires making multiple copies of the same packet. For purposes of discussion, multicast includes all of the following:

pure multicast: L2 and L3 multicast;
diagnostic: snooping, monitoring, mirroring for security purposes; and
broadcast: flood-to-VLAN, flood-to-broadcast domain for network management, increase in percentage of multicast and broadcast packets in the network.

The most common and widely used method of replicating packets in a network chip is by parsing linear linked lists that each defines a rule for multicasting. All nodes of a linear linked list are stored as entries in a replication table. Each entry includes data and a pointer or reference to the next entry. A lookup using a key against a TCAM (ternary content-addressable memory) or SRAM (static random access memory) returns a pointer to an entry in the replication table. That entry in the replication table will provide a pointer to the next entry in the table. Each time a valid entry is found, a copy is created. However, maintaining and, thus traversing as well, all the nodes of the linear linked list is inefficient since one or more of the nodes of the linked list could be identical and are redundantly stored in the replication table.

In some embodiments, to make the representation of the nodes more efficient in memory, redundancies are eliminated. In particular, the linear linked list is decoupled and groups of sequential nodes in the linear linked list are formed. The groups are ordered into a hierarchical linked list with N tiers. Each tier or level in the hierarchical linked list corresponds to a network layer of a network stack that requires replication. Redundant groups in each tier are eliminated such that the groups in each tier are stored exactly once in the replication table. The multicast replication engine replicates a packet by traversing the hierarchical linked list rather than the linear linked list. Traversing the hierarchical linked list is similar to traversing a tree structure. In some embodiments, the hierarchical linked list is implemented in hardware.

Herein, "LN" is used as an abbreviation for layer N of the network stack. For example, L2 is the abbreviation for Layer 2 of the network stack. For another example, L3 is the abbreviation for Layer 3 of the network stack.

FIG. 1 illustrates an exemplary 2-tier linked list 100 in accordance with some embodiments. The 2-tier linked list 100 defines a rule for multicasting a packet. The 2-tier linked list 100 includes one L3 group, which is shown as the L3 linked list in FIG. 1. The L3 linked list includes four nodes, which are labeled as Node 0, Node 1, Node 2 and Node 3. The 2-tier linked list 100 also includes two L2 groups, which are shown as the top and bottom L2 linked lists in FIG. 1. The top L2 linked list includes three nodes, which are labeled as Node A, Node B and Node C. The bottom L2 linked list includes two nodes, which are labeled as Node D and Node E. Each of these groups or linked lists is stored only once in the replication table. The nodes in L2 are associated with replications needed for network layer 2 functionalities, whereas the nodes in L3 are associated with replications needed for network layer 3 functionalities.

For the 2-tier linked list 100, each entry in the replication table contains two pointers—an L2 pointer and an L3 pointer—stored in the Nxt_L2 field and in the Nxt_L3 field, respectively. The L3 pointers describe the trunk of a tree (e.g., tier 1 of the hierarchical linked list 100), and the L2 pointers describe the branches of the tree (e.g., tier 2 of the hierarchical linked list 100). While the Nxt_L3 field and the Nxt_L2 field of each node in the L3 linked list can contain either a pointer value or a NULL value, the Nxt_L3 field of each node in a L2 linked list typically contains a NULL value and the Nxt_L2 field of each node in the L2 linked list can contain either a pointer value or a NULL value.

In addition to the two pointers, each entry in the replication table contains a number of fields that controls whether copies are made and how to modify them relative to the original. Each entry in the replication table that is traversed thus describes a potential copy of the packet in the Copy ID field.

Typically, a TCAM or SRAM lookup provides a pointer into the replication table. The pointer points to the first L3 pointer of the L3 linked list (trunk). Based on a traversal algorithm, the multicast replication engine follows each L2 pointer and reads the entry corresponding to that pointer until it finds a L2 pointer that is null or invalid, which is shown as NULL in the Nxt_L2 field in FIG. 1. At that point, the multicast replication engine returns to a specified L3 pointer and follows that to the next branch on the trunk.

Figure 2:
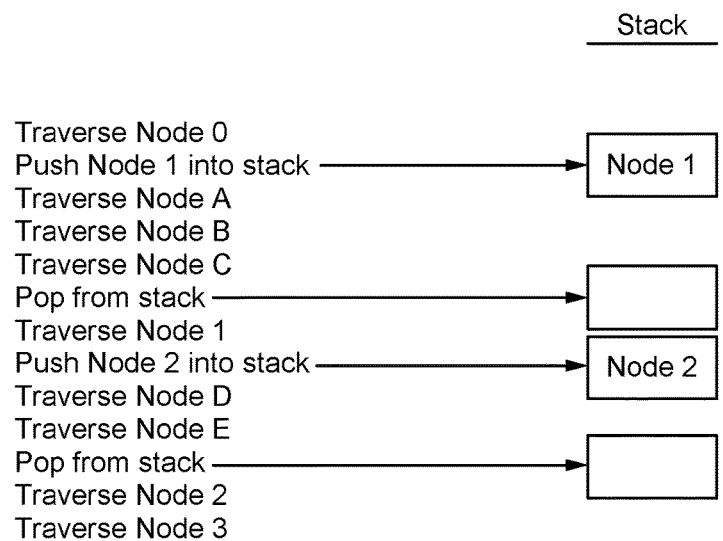
FIG. 2 illustrates an exemplary process of traversing the 2-linked list of FIG. 1 in accordance with some embodiments of the present invention.

In some embodiments, a LIFO (last in, first out) stack is used to traverse the hierarchical linked list 100. While following the L3 linked list, if the entry for a node includes a valid Nxt_L3 field (e.g., not NULL), then data regarding that next node is saved on the stack at each hop, allowing for branching limited by the depth of the stack. The LIFO stack that has a stack depth of one. Generally, a N-tier linked list uses a LIFO stack that has a stack depth of N−1. The multicast replication engine stores in the LIFO stack data regarding a node of the N-tier linked list at each hop across tiers of the N-tier linked list away from the trunk of the N-tier linked list, and removes from the LIFO stack data regarding a node of the N-tier linked list at each hop across tiers of the N-tier linked list towards the trunk of the N-tier linked list. FIG. 2 illustrates an exemplary process of traversing the 2-linked list of FIG. 1 in accordance with some embodiments.

While following a L2 linked list, the multicast replication engine ignores the Nxt_L3 field. Typically, the Nxt_L3 field is NULL, which is shown as X in FIG. 1, such that only a single pointer needs to be saved at any point in time, thereby reducing hardware complexity.

Assume that a node in another L3 linked list also includes the nodes of the top L2 linked list shown in FIG. 1. The Nxt_L2 field of the entry for that L3 node can simply include a pointer to the top L2 linked list. Since no groups of sequential nodes are redundantly stored in the replication table, the representation of a multicast rule is efficiently maintained in the replication table.

Figure 3:
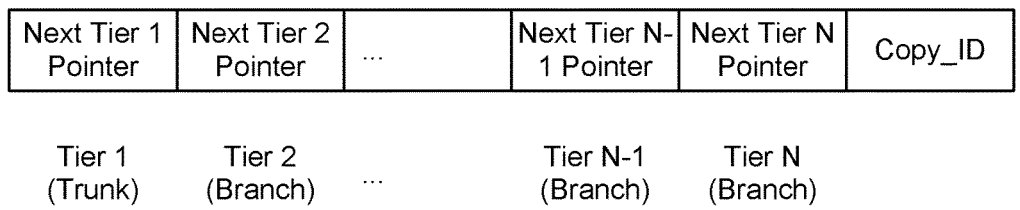
FIG. 3 illustrates an exemplary entry for a node in a hierarchical linked list with N tiers in accordance with some embodiments of the present invention.

Generally, each node in hierarchical linked list with N tiers is stored as an entry in the replication table. FIG. 3 illustrates an exemplary entry 300 for a node in the hierarchical linked list with N tiers in accordance with some embodiments. The entry 300 includes N pointer fields and control fields. A first pointer field of the N pointer fields for a node in the $i^{th}$ tier of the N-tier linked list includes a pointer to the next node in the $i^{th}$ tier of the N-tier linked list or a NULL value. A second pointer field of the N pointer fields for the node in the $i^{th}$ tier of the N-tier linked list includes a pointer to a node in the $(i+1)^{th}$ tier of the N-tier linked list or a NULL value. The node in the $(i+1)^{th}$ tier of the N-tier linked list is typically the first node in a linked list.

Figure 4:
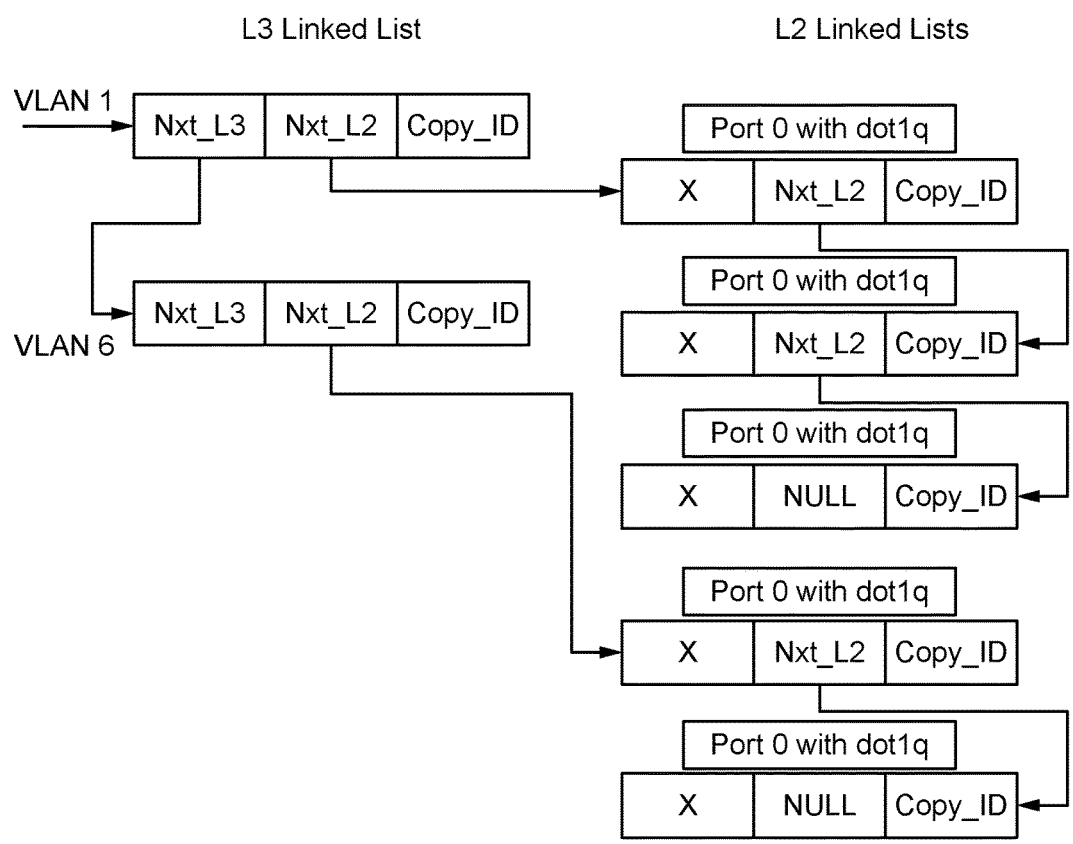
FIG. 4 illustrates a hierarchical linked list for the hypothetical scenario in accordance with some embodiments of the present invention.

In a hypothetical scenario, an IP multicast packet needs to be replicated to a number of different VLANs (virtual local area networks), and the packet needs to be then replicated multiple times within each VLAN. A forwarding engine typically derives an entry point or pointer into a replication table that points to a unique trunk for a corresponding IP multicast group. Each node in the trunk represents a VLAN that is part of this IP multicast group. An L2 pointer branch represents each unique link within that VLAN. If the same VLAN is present in multiple IP multicast groups, only one branch needs to stored in the replication table for that VLAN, and it can be pointed to by multiple L3 trunks, thus eliminating redundancy in storing the L2 replication lists. FIG. 4 illustrates a hierarchical linked list 400 for the hypothetical scenario in accordance with some embodiments. The hierarchical linked list 400 represents a multicast rule. In this hypothetical scenario, the packet will be replicated for VLAN 1 and VLAN 6. Within VLAN 1, three copies are generated with dot1q for Port 0. Within VLAN 6, two copies are generated with dot1q for Port 1. As illustrated in FIG. 4, the multicast replication engine replicates the IP multicast packet according to the multicast rule by traversing the linked list 300.

Figure 5A:
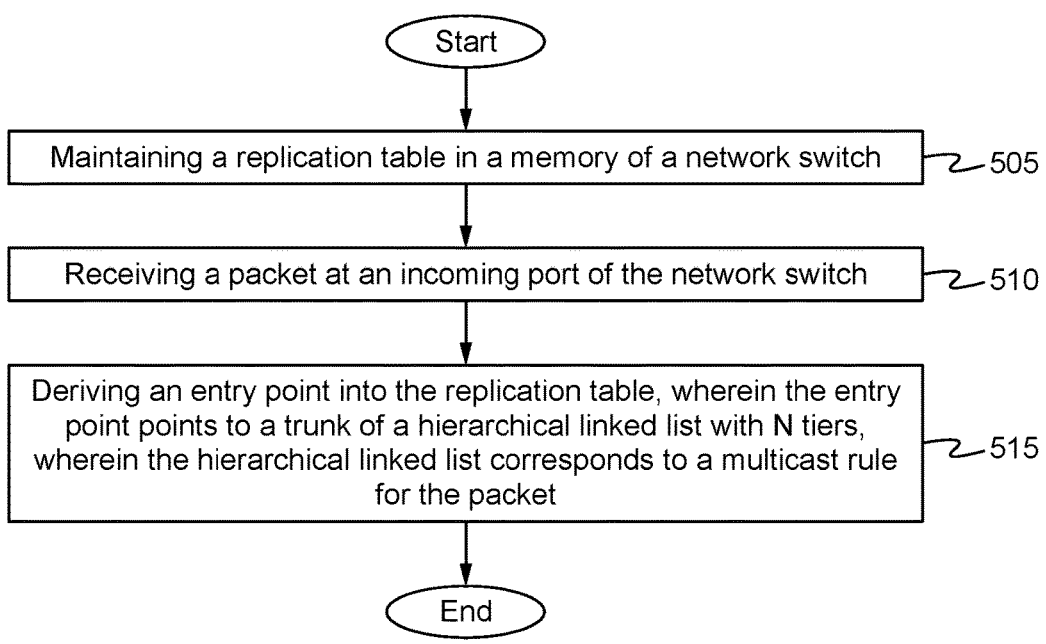
FIGS. 5A-5B illustrate exemplary methods of implementing a network switch in accordance with some embodiments of the present invention.
Figure 5B:
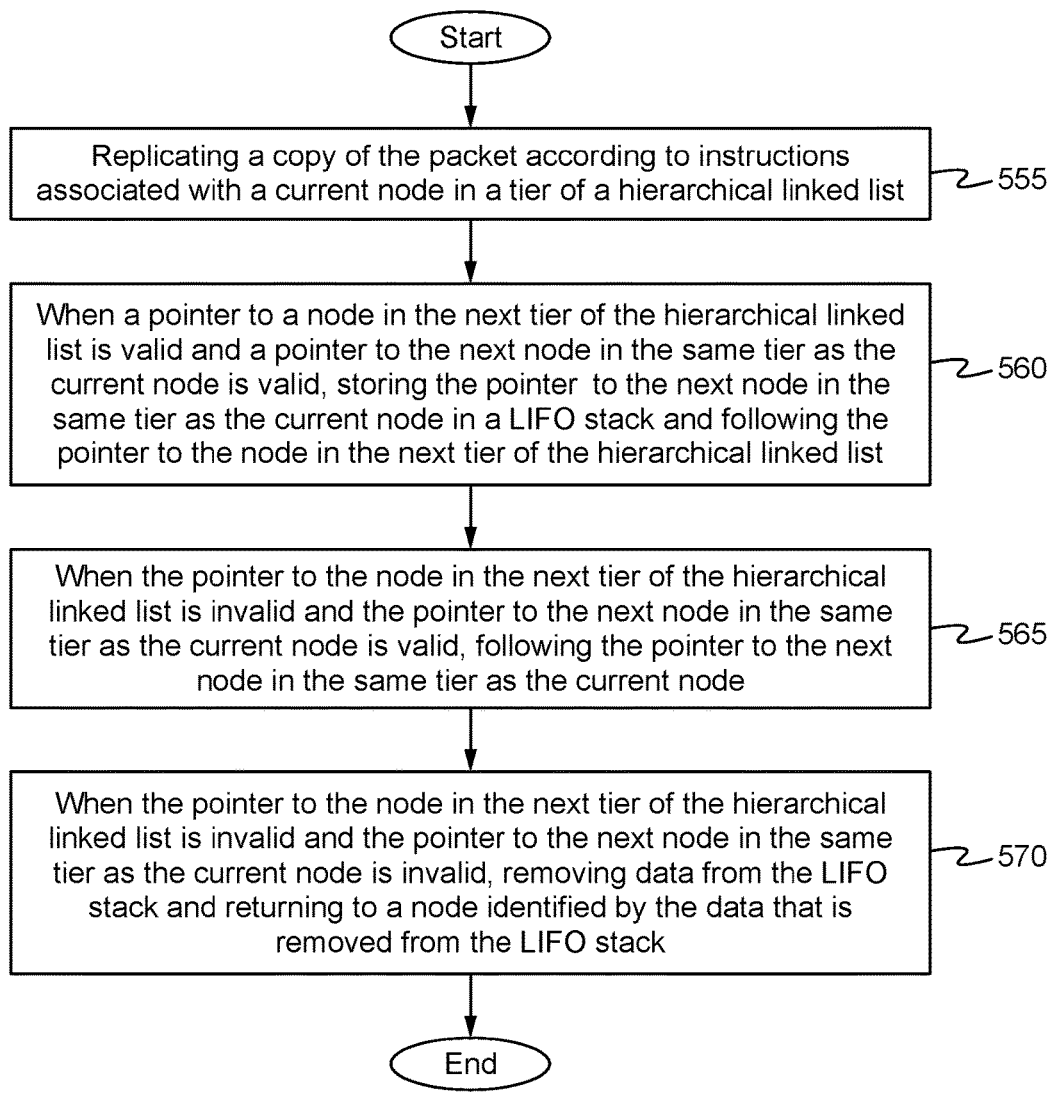

FIGS. 5A-5B illustrate exemplary methods 500, 550 of implementing a network switch in accordance with some embodiments. Referring to FIG. 5A, at a step 505, a replication table is maintained in a memory of the network switch. At a step 510, a packet is received at an incoming port of the network switch. Typically, a multicast rule for the packet is stored in the replication table. At a step 515, an entry point into the replication table is derived. In some embodiments, the entry point is derived by the forwarding engine. The entry point points to a trunk of a hierarchical linked list with N tiers. The hierarchical linked list typically corresponds to the multicast rule for the packet. In some embodiments, the trunk is the first tier of the hierarchical linked list, while branches are subsequent tiers of the hierarchical linked list.

For each node of the hierarchical linked list, the method 450 of FIG. 5B is performed. At a step 555, the multicast replication engine replicates the packet according to instructions associated with a current node in a tier of the hierarchical linked list. At a step 560, when a pointer to a node in the next tier of the hierarchical linked list is valid and a pointer to the next node in the same tier as the current node is valid, the pointer to the next node in the same tier as the current node is stored in a LIFO stack and the multicast replication engine follows the pointer to the node in the next tier of the hierarchical linked list. At a step 565, when the pointer to the node in the next tier of the hierarchical linked list is invalid and the pointer to the next node in the same tier as the current node is valid, the multicast replication engine follows the pointer to the next node in the same tier as the current node. At a step 570, when the pointer to the node in the next tier is invalid and the pointer to the next node in the same tier as the current node is valid, data from the LIFO stack is removed and the multicast replication engine returns to a node identified by the data removed from the LIFO stack. The method 450 is repeated.

Figures 6, 7:
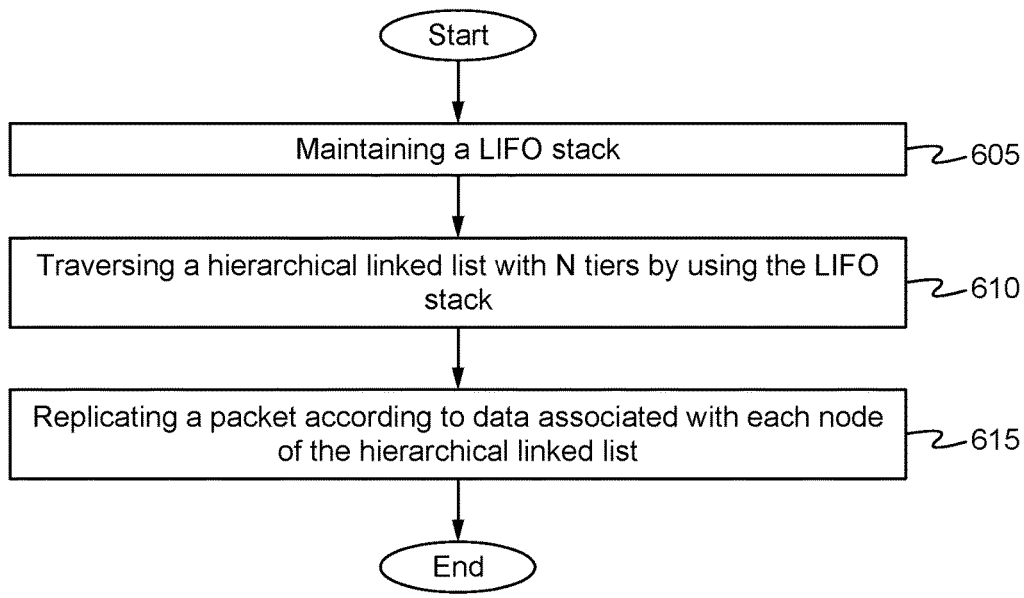
FIG. 6 illustrates an exemplary method of implementing a multicast replication engine in accordance with some embodiments of the present invention.
FIG. 7 illustrates an exemplary portion of a multicast destination table in accordance with some embodiments of the present invention.

FIG. 6 illustrates an exemplary method 600 of implementing a multicast replication engine in accordance with some embodiments. At a step 605, a LIFO stack is maintained. At a step 610, a hierarchical linked list with N tiers is traversed using the LIFO stack. The hierarchical linked list is stored in a replication table and represents a multicast rule. In some embodiments, data regarding a node of the hierarchical linked list is stored in the LIFO stack at each hop across tiers of the hierarchical linked list away from a trunk of the hierarchical linked list. In some embodiments, data regarding a node of the hierarchical linked list is removed from the LIFO stack at each hop across tiers of the hierarchical linked list towards the trunk of the hierarchical linked list. In some embodiments, the trunk is the first tier of the hierarchical linked list.

In some embodiments, the replication table includes a plurality of multicast rules. Each of the plurality of multicast rules is stored in multiple nodes arranged in a plurality of tiers. At least a portion of the multiple nodes is used by (e.g., pointed to) by two or more of the plurality of multicast rules, thereby reducing redundancy in storing these nodes.

Mirroring

Mirroring of packets based on various criteria is an important feature of network devices and can be used for a variety of applications ranging from network diagnostics to lawful intercept. Mirroring involves creating an identical copy of a packet and sending the copy to a special port to which an analyzer is connected. Mirroring also involves forwarding packets over networking tunnels to remote analyzers.

Traditionally, mirroring is performed as a dedicated function that is separate from all other packet transformation functions. Local mirroring (to another port on the same device) and remote mirroring (encapsulating the mirror packet in a tunnel header) are frequently separate operations. In the prior art, logic to handle mirror packets is dispersed all over the chip. A small local mirroring table or larger global mirroring table is consulted to determine whether a packet should be mirrored. Furthermore, since there is no concept of flow (e.g., no difference in mirroring for any packet), a limit on the total number of concurrent mirroring sessions is based on the size of the mirroring table.

In some embodiments, the mirroring function is implemented by the same logic, namely the multicast replication engine, that performs the multicast replication function discussed above. In particular, a forwarding pipeline of the forwarding engine includes a mirror bit mask vector with one bit per supported independent mirror session. If the multicast replication engine supports 16 mirror sessions, then the mirror bit mask vector used is 16-bits wide. Each bit in the mirror bit mask vector can be set at any point in the forwarding pipeline when the forwarding engine determines that conditions for a corresponding mirror session are met. For example, a bit in the mirror bit mask vector can be set based on the characteristics of a packet (for example, a source port, a destination port, a MAC address, an IP address, a VLAN, etc.). At the end of the forwarding pipeline, if any of the bits in the mirror bit mask vector is set, then the packet, the mirror bit mask vector and a pointer to the start of a "mirror destination linked list" are forwarded to the multicast replication engine. The mirror destination linked list typically defines a rule for mirroring. The multicast replication engine mirrors the packet according to the mirror destination linked list and the mirror bit mask vector.

In some embodiments, the mirror destination linked list includes one node for each possible mirror destination. All nodes of the mirror destination linked list are stored as entries in a multicast destination table. Each entry includes a pointer or reference to the next entry, a session ID of a mirror session to which a corresponding node pertains, and destination information (for example, egress virtual interface). At each node, the multicast replication engine determines whether or not to make a copy of the packet.

As it will become evident from the discussion, decoupling the mirror session identifications and the actual creation of packets advantageously provide flexibility on how conditions are assigned to mirror sessions. Exemplary use cases of mirroring include but are not limited to:

local mirroring: uses local port in the destination information remote mirroring: uses tunnel in destination information multiple sessions: automatically supported through multiple bits in the mirror bit mask vector multiple destinations per session: supported by adding multiple nodes with the same session ID to the mirror destination linked list.

FIG. 7 illustrates an exemplary portion of a multicast destination table 700 in accordance with some embodiments. Each entry in the multicast destination table 700 includes the following fields: the ptr field, the evif field, the mirrorEn field, the sessionID field and the nextPtr field. The ptr field stores identification information of a corresponding entry. In some embodiments, the identification information identifies an ingress interface. The evif field stores the destination information. The destination information indicates a port or a group of ports for local mirroring, a tunnel or a group of tunnels for remote mirroring, an abstraction such as a virtual interface, etc. The mirrorEn field indicates whether mirroring is "generally" or "globally" enabled for a respective session for the corresponding entry. In contrast, each bit in the mirror bit mask vector indicates whether mirroring is "specifically" enabled for a packet associated with the respective session. The nextPtr field stores the pointer or reference to the next entry in the multicast replication table 700, which corresponds to the next node of the mirror destination linked list.

In addition to any multicast related operations it may need to do for this packet, the multicast replication engine traverses the mirror destination linked list. The multicast replication engine extracts the mirror bit mask vector from the packet context (e.g., flow). The multicast replication engine receives the entry point to the start of the mirror destination linked list and, at each node, uses the session ID to determine a corresponding mirror mask bit in the mirror bit mask vector.

The mirrorEn field and a mask bit in the mirror bit mask vector advantageously provide two levels of provisions to enable replication. If the mirrorEn field is not enabled (e.g., set to "0"), then a copy of the packet will not be made. If the mirrorEn field is enabled (e.g., set to "1") and the corresponding mask bit is enabled (e.g., mirror bit mask vector [sessionID] set to "1"), then a copy with the destination information of a corresponding linked list entry will be made. If the mirrorEn field is enabled (e.g., set to "1") and the corresponding mask bit is not enabled (e.g., mirror bit mask vector[sessionID] set to "0"), then a copy of the packet will not be made.

Referring to FIG. 7, assume the network switch supports 16 concurrent mirror sessions, although more or less concurrent mirror sessions can be supported. The Input mirror bit mask vector is 16-bits wide. Further assume the mirror bit mask vector has the value 00111100_00111100. Eight sessions, namely sessions 2-5 and 10-13, are enabled (set to "1") indicating that these sessions will be mirrored. This input mirror mask vector is typically produced and forwarded by the forwarding engine, which has determined that conditions for mirror sessions 2-5 and 10-13 were met but conditions for mirror sessions 0, 1, 6-9, 14 and 15 were not met.

In a first scenario, an input pointer is 34. A lookup is done with key=34 against the multicast destination table 600. Session ID is 5, and since the mirrorEn field is enabled (set to "1") and mirror_bit_mask_vector[5] is enabled (set to "1") at entry 34, a copy is created and the copy is sent with an egress interface 10 (evif=10). The copy is then forwarded using the same logic used for multicast replication. Since the next pointer is 38, a lookup is again done with key=38 against the multicast destination table 600. Session ID is 1, and since the mirrorEn field is enabled (set to "1") and mirror_bit_mask_vector[1] is not enabled (set to "0") at entry 38, no copy is created. Mirroring stops here because the next pointer is invalid (set to NULL).

In a second scenario, still referring to FIG. 7, an input pointer is 20. A lookup is done with key=20 against the multicast destination table 600. Session ID is 3, and since the mirrorEn field is enabled (set to "1") and mirror_bit_mask_vector[3] is enabled (set to "1") at entry 20, a copy is created and the copy is sent with an egress interface 8 (evif=8). The copy is then forwarded using the same logic used for multicast replication. Mirroring stops here because the next pointer is invalid (set to NULL).

In some embodiments, the network switch is able to send packets to different subsets of the configured mirror sessions independently. For example, if five destinations are to be linked to the same session, then five entries with that session ID are added to the multicast destination table 700. For another example, if a packet needs to be mirrored to a particular MAC address, a particular IP address, a particular port number, then an entry with these destinations is added to the multicast destination table 700. The multicast destination table 700 allows flexibility on how destinations are linked to each mirror session.

Figure 8A:
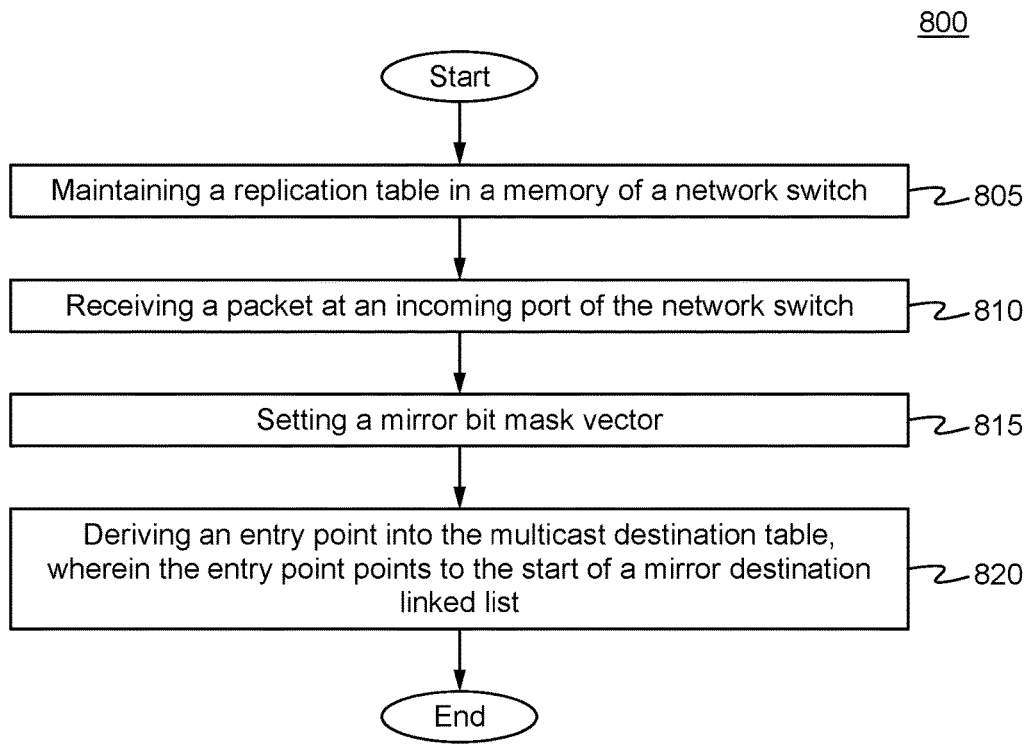
FIGS. 8A-8B illustrate exemplary methods of implementing a network switch in accordance with some embodiments of the present invention.
Figure 8B:
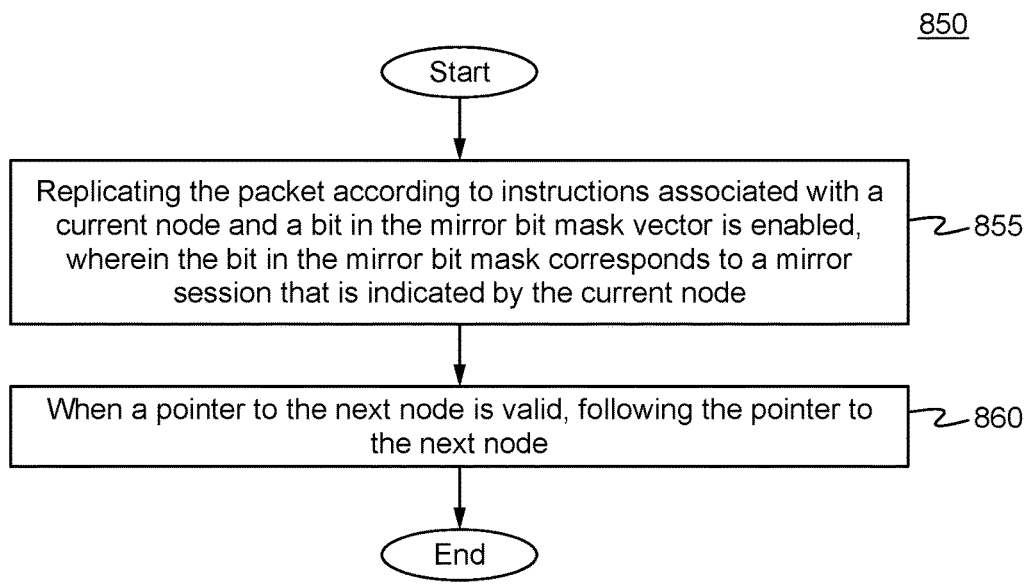

FIGS. 8A-8B illustrate exemplary methods 800, 850 of implementing a network switch in accordance with some embodiments. Referring to FIG. 8A, at a step 805, a multicast destination table is maintained in a memory of the network switch. At a step 810, a packet is received at an incoming port of the network switch. Typically, a mirroring rule for the packet is stored in the multicast destination table. At a step 815, a mirror_bit_mask_vector is set. In some embodiments, the mirror_bit_mask_vector is set based on characteristics of the packet by a forwarding engine and is forwarded to a multicast replication engine by the forwarding engine. The mirror_bit_mask_vector includes one bit per supported mirror session. At a step 820, an entry point into the multicast destination table is derived. The entry point points to the start of a mirror destination linked list. The mirror destination linked list typically corresponds to the mirroring rule for the packet.

For each node of the mirror destination linked list, the method 850 of FIG. 8B is performed. At a step 855, the multicast replication engine replicates the packet according to instructions associated with a current node in the mirror destination linked list and to a bit in the mirror_bit_mask_vector. The bit in the mirror bit mask corresponds to a mirror session that is indicated by the current node. The instructions include a global mirror bit that indicates whether the mirror session is valid. The instructions also include destination information. The packet is replicated when the global mirror bit is valid and when the bit in the mirror bit mask is valid. The packet is replicated with destination information associated with the current node. At a step 860, when a pointer to the next node is valid, the multicast replication engine follows the pointer to the next node. Otherwise, mirroring for the packet is completed.

Figures 9, 10:
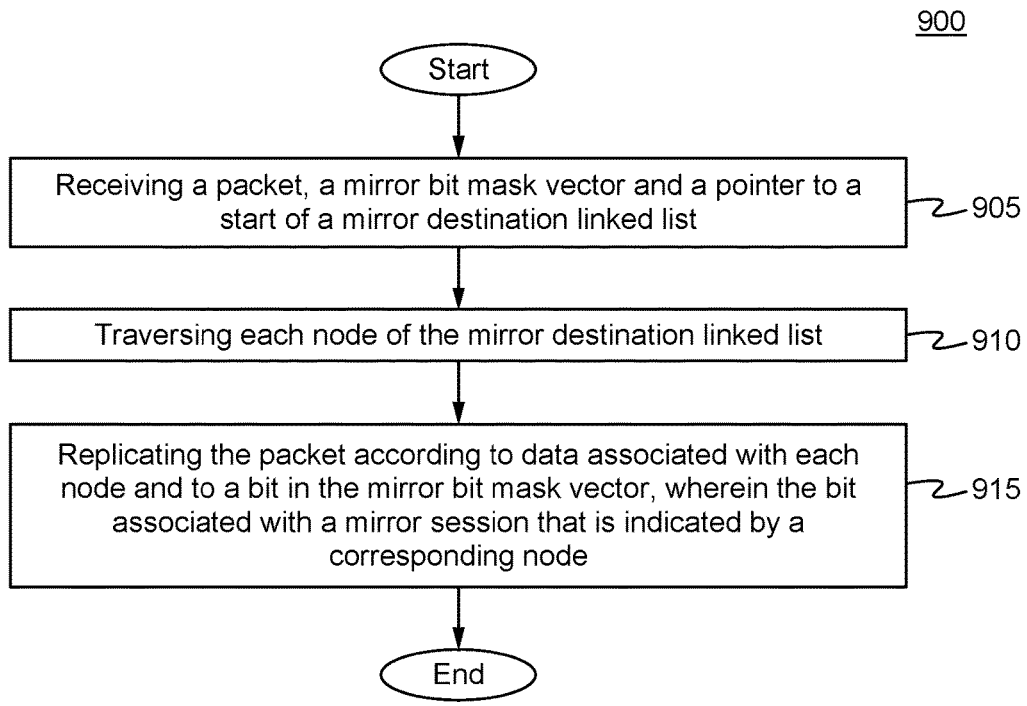
FIG. 9 illustrates an exemplary method of implementing a multicast replication engine in accordance with some embodiments of the present invention.
FIG. 10 illustrates an exemplary portion of a multicast destination table in accordance with some embodiments of the present invention

FIG. 9 illustrates exemplary method 900 of implementing a multicast replication engine in accordance with some embodiments. At a step 905, a packet, a mirror_bit_mask_vector and a pointer to a start of a mirror destination linked list are received. The mirror destination linked list is stored in a multicast destination table. At a step 910, each node of the mirror destination linked list is traversed. At a step 915, the packet is replicated according to data associated with each node and to a bit in the mirror_bit_mask_vector. This bit is typically associated with a mirror session that is indicated by a corresponding node. The data includes identification information of the corresponding node, destination information, and pointer to the next node. The data also includes whether a global mirror bit for the mirror session is valid.

The mirror destination linked list includes one node for each possible mirror destination. In some embodiments, the mirror destination linked list includes multiple nodes with the same session ID for different mirror destinations. In some embodiments, the multicast destination table includes a plurality of mirroring rules.

Link Switchover

Reliability, lossless communication, high data rate are critical in information/data transfer. Link failures can occur and are a common cause of disruptions in networks. Prior art solutions exists that enable traffic to be rerouted to working links in case of link failures. However, these prior art solutions involve significant hardware that is expensive in terms of logic and power, significant amount of software intervention (to reconfigure the forwarding tables to use the new link) once the failure has been detected, or both.

In some embodiments, a link switchover feature in implemented as an expansion of the multicast replication engine. The multicast replication engine contains the following features, which are used to implement link switchover:
 Feature 1: two additional bit fields in the multicast destination table: a liveEn field and a live field; and
 Feature 2: linked list based programming.

The multicast destination table is programmable. The multicast destination table contains a failover linked list, which is a list of links. The failover linked list typically defines a rule for switchover. The list of links includes the main link that is currently in use and alternate links to reach the same destination. The links in the list of links are ordered based on a metric. In some embodiments, this list is programmed in order of preference (e.g., shortest route, minimum bandwidth, etc.). Each of the links is stored as an entry in the multicast destination table.

Initially, all links in this list are programmed with both a "first live enabled" bit and a "live" bit as enabled (e.g., set to "1"). The "first live enabled" bit indicates whether the switchover feature is enabled. The "live" bit indicates whether a corresponding link is live or active. The multicast replication engine traverses the list of links. If an entry is found in the multicast destination table that has both the "first live enabled" bit and the "live" bit enabled, then the traversal is stopped and a copy is made. If a link is detected as being down or inactive, such as based on a timeout error, then software performs a single hardware access to program or disable the "live" bit of the primary link as being inactive (e.g., set to "0"). This will cause the multicast replication engine to proceed to the next entry in the linked list where both of these bits are enabled.

FIG. 10 illustrates an exemplary portion of a multicast destination table 1000 in accordance with some embodiments. Each entry in the multicast destination table 1000 includes the following fields: the ptr field, the evif field, the liveEn field, the live field and the nextPtr field. As discussed above, the ptr field stores identification information of a corresponding entry, the evif field stores the destination information, and the nextPtr field stores the pointer or reference to the next entry. The liveEn field corresponds to the "first live enabled" bit that is initially enabled. The live field corresponds to the "live" bit initially enabled and is continuously updated via software based on whether a corresponding link is up or down.

The conditions for traversal and copy generation are as follows:
 If the liveEn bit is not enabled (e.g., set to "0"), then perform regular device operation (e.g., the link switchover feature not enabled).
 If the liveEn bit is enabled (e.g., set to "1") && live bit is not enabled (e.g., set to "0"), then do not generate a copy and move to next link in route linked list.
 If the liveEn is enabled (e.g., set to "1") && live bit is enabled (e.g., set to "1"), the generate a copy and terminate linked list traversal.

The linked list is maintained and kept up to date by software, but only one hardware access is required during the critical time between link failure detection and switchover complete. In some embodiments, software preconfigures all entries in the linked list either at initialization or dynamically during runtime based on the priority of links to be used to route to a given destination. More precisely, software programs alternate logical interfaces to the same destination, where a logical interface is either a link or a set of links or map to any physical interface. Once programmed, the network chip is able to do a fast switch over in hardware by changing the outgoing interface of the packet in the control path. This switchover feature is completely agnostic of whether it is an L2 packet or L3 packet or whether it is an L2 network or L3 network. In other words, this switchover feature is network layer agnostic.

Referring to FIG. 10, each of the three entries shown has the liveEn field enabled (e.g., set to "1"). In a first scenario, an input pointer is 34. A lookup is done with key=34 against the multicast destination table 1000. Since the liveEn field is enabled (e.g., set to "1") and the live field is not enabled (set to "0") at entry 34, a copy is not generated. Another lookup is done using nxtPtr=38 as key against the multicast destination table 1000. Since the liveEn field is enabled (e.g., set to "1") and the live field is enabled (set to "1") at entry 38, a copy is created and sent with an egress interface 20 (evif=20). The copy is then forwarded using the same logic used for multicast replication. Lookup stops here because both the liveEn field and the live field are enabled.

In a second scenario, still referring to FIG. 10, an input pointer is 20. A lookup is done with key=20 against the multicast destination table 1000. Since the liveEn field is enabled (e.g., set to "1") and the live field is enabled (e.g., set to "1") at entry 20, a copy is created and sent out with an egress interface 8 (evif=8). The copy is then forwarded using the same logic used for multicast replication. Lookup stops here because both the liveEn field and the live field are enabled.

Figure 11:
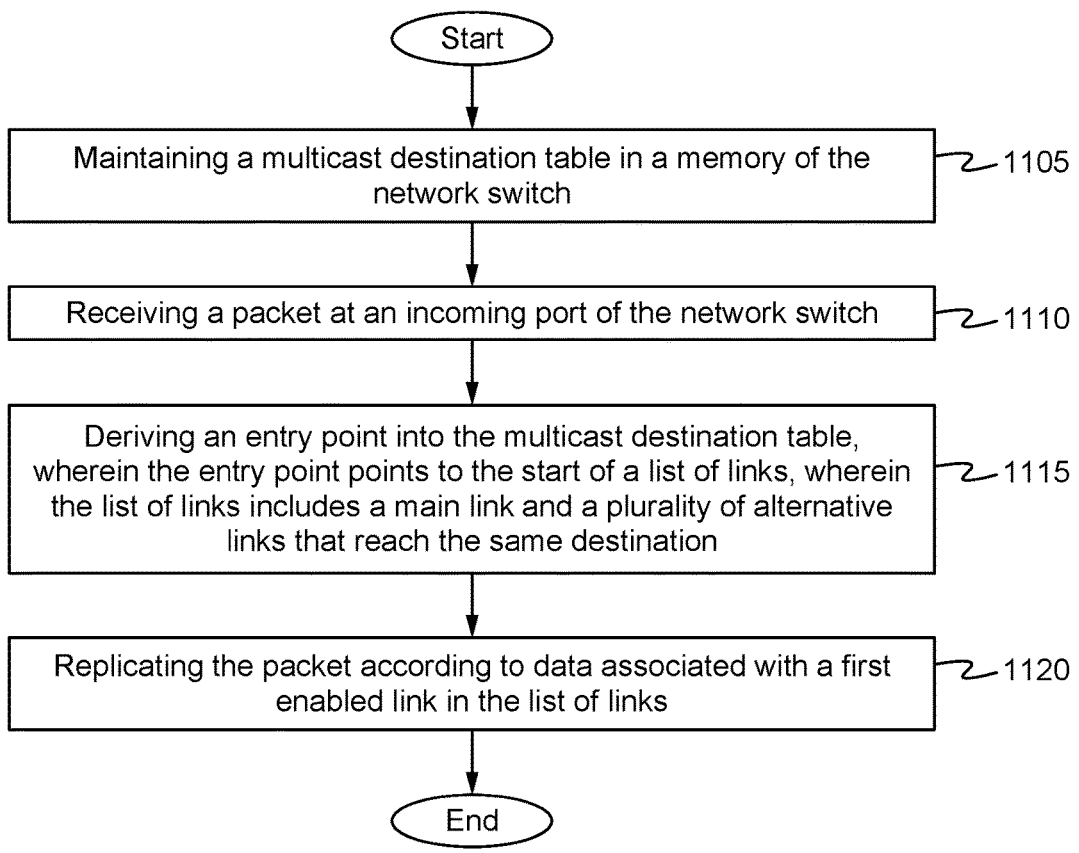
FIG. 11 illustrates an exemplary method of implementing a network switch in accordance with some embodiments of the present invention.

FIG. 11 illustrates an exemplary method 1100 of implementing a network switch in accordance with some embodiments. At a step 1105, a multicast destination table is maintained in a memory of the network switch. In some embodiments, prior to the step 1105, the multicast destination table is preconfigured via software with entries corresponding to a list of links. At a step 1110, a packet is received at an incoming port of the network switch. At a step 1115, an entry point into the multicast destination table is derived. The entry point points to the start of the list of links. The list of links includes a main link and a plurality of alternative links that reach the same destination. At a step 1120, the packet is replicated according to data associated with a first enabled link in the list of the links. The first enabled link in the list of links is typically a link that is active.

The network switch is able to detect link failure at one of the links in the list of links. Similarly, the network switch is also able to detect recovery of a failed link in the list of links. Upon one of these detections, a respective entry in the multicast destination table is modified accordingly. In some embodiments, the link changes detected via software. In some embodiments, entries are modified via software. In some embodiments, a switchover is performed in hardware by changing an outgoing interface of the packet in a control path.

Figure 12:
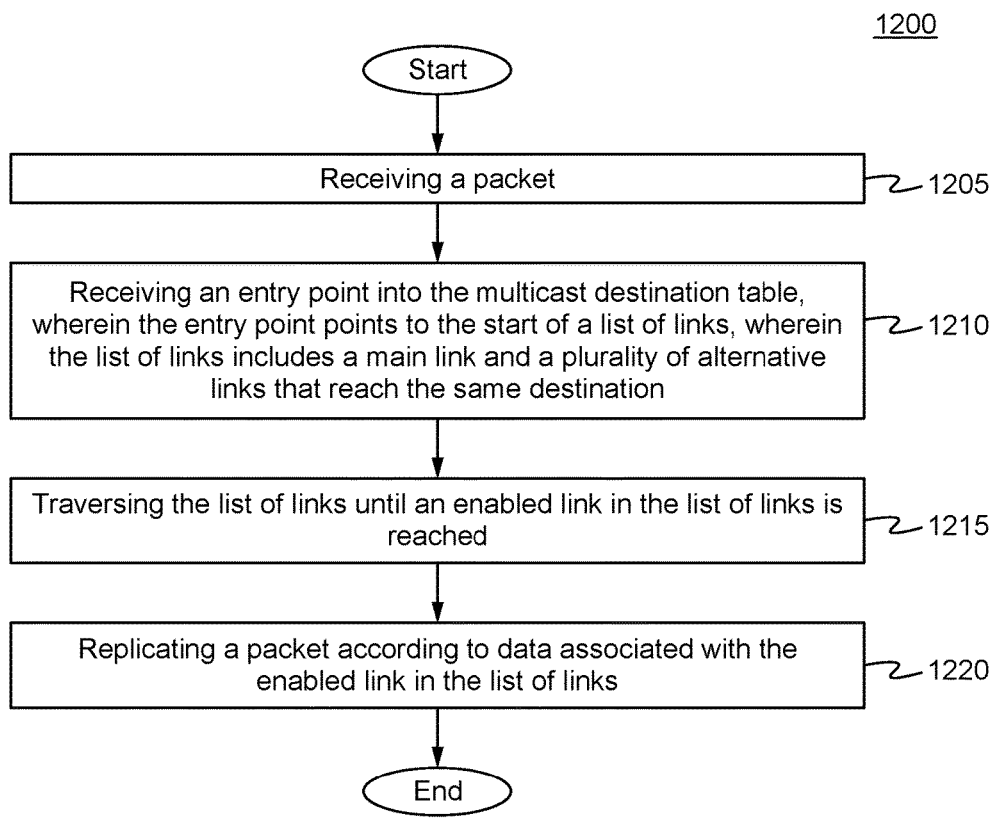
FIG. 12 illustrates an exemplary method of implementing a multicast replication engine in accordance with some embodiments of the present invention.

FIG. 12 illustrates an exemplary method 1200 of implementing a multicast replication engine in accordance with some embodiments. In some embodiments, the multicast replication engine implements the switchover feature. At a step 1205, a packet is received. At a step 1210, an entry point into a multicast destination table is received. The entry point points to the start of a list of links. The list of links includes a main link and a plurality of alternative links that reach the same destination. Each link of the list of links is stored as an entry in the multicast destination table. At a step 1215, the list of links is traversed until an enabled link in the list of links is reached. The enabled link is active and can be either the main link or one of the plurality of alternate links. At a step 1220, the packet is replicated according to data associated with the enabled link in the list of links. The data includes identification information of a corresponding link, destination information, a pointer to the next link. The data also includes a "live" bit that indicates that the enabled link is active. In some embodiments, the packet is replicated with the destination information.

Multicast Replication Engine

A network device, such as a network switch, implements the multicast replication engine. In some embodiments, the multicast replication engine includes a circuit that replicates packets, mirrors packets and performs link switchovers. The network switch includes a memory that includes the replication table and the mirror destination table. The replication table stores at least one multicast rule, which is represented in a hierarchical linked list with N tiers. The mirror destination table stores at least one mirroring rule, which is represented in a mirror destination linked list, and at least one switchover rule, which is represented in a failover linked list. The multicast replication engine accesses the replication table and the mirror destination table when packets are being processed by the multicast replication engine.

Figure 13:
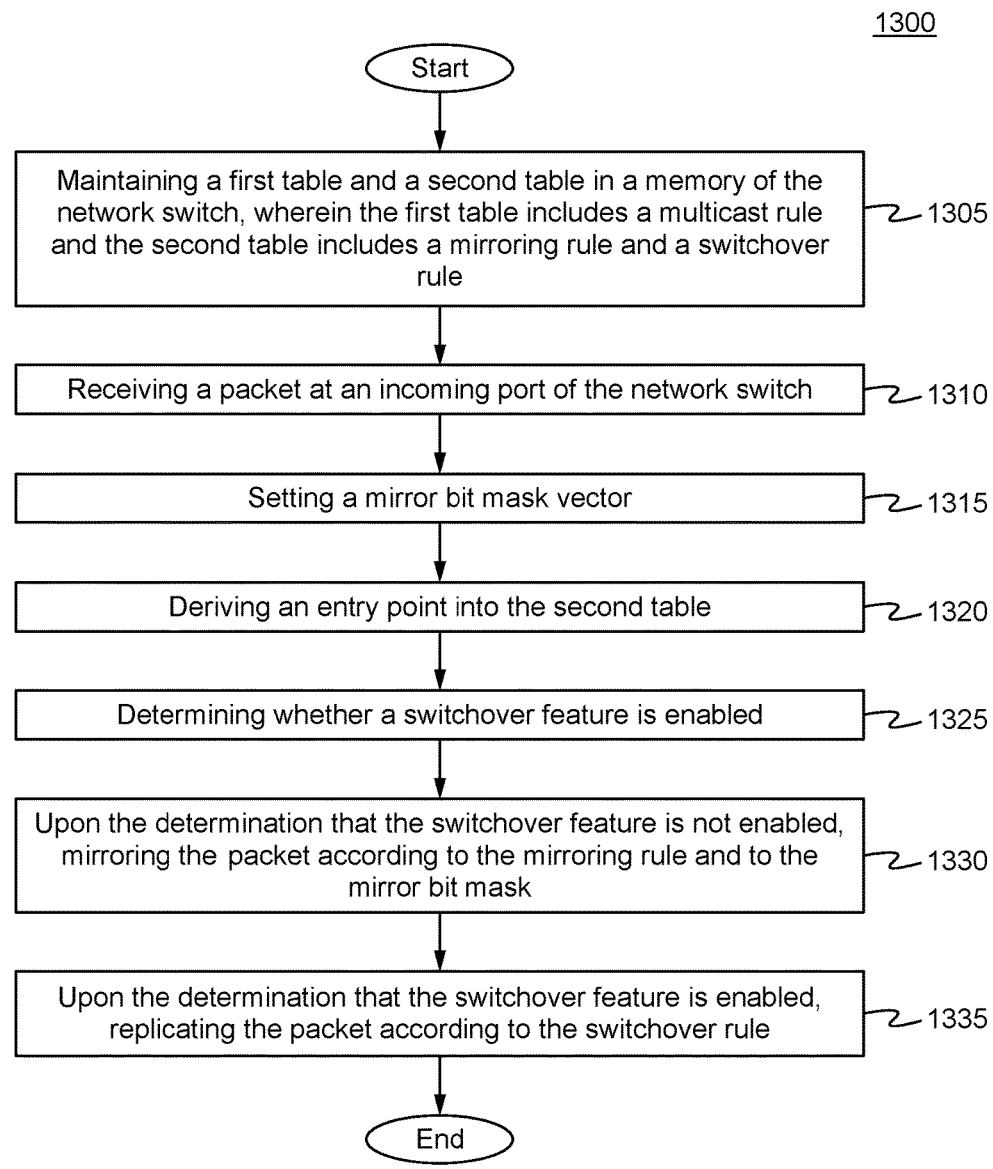
FIG. 13 illustrates an exemplary method of implementing a network switch in accordance with some embodiments of the present invention.

FIG. 13 illustrates an exemplary method 1300 of implementing a network switch in accordance with some embodiments. At a step 1305, a first table and a second table are maintained in a memory of the network switch. The first table includes a multicast rule that is represented in a hierarchical linked list with N tiers. The second table includes a mirroring rule that is represented in a first linked list and a switchover rule that is represented in a second linked list.

At a step 1310, a packet is received at an incoming port of the network switch.

At a step 1315, a mirror_bit_mask_vector is set. In some embodiments, each bit in the mirror_bit_mask_vector is set at any point in a forwarding pipeline of the forwarding engine when the forwarding engine determines that conditions for a respective mirror session for a corresponding bit are met. The forwarding engine forwards the mirror_bit_mask_vector to a multicast replication engine.

At a step 1320, an entry point into the second table is derived. The forwarding engine forwards the entry point to the multicast replication engine.

At a step 1325, the multicast replication engine determines whether a switchover feature is enabled.

At a step 1330, upon the determination that the switchover feature is not enabled, the packet is mirrored according to the mirroring rule and to the mirror bit mask. In some embodiments, the multicast replication engine traverses each node of the first linked list. For each node of the first linked list, a copy of the packet is made according to instructions associated with a current node and to a bit in the mirror_bit_mask_vector. The bit in the mirror bit mask corresponds to a mirror session that is indicated by the current node. The copy is made when a global mirror bit is valid and when the bit in the mirror bit mask is valid. If a pointer to the next node is valid, the pointer to the next node is followed.

At a step 1335, upon the determination that the switchover feature is enabled, the packet is replicated according to the switchover rule. In some embodiments, the multicast replication engine traverses the second linked list until a live link in the second linked list is reached and makes a copy of the packet according to instructions associated with the live link.

All copies are forwarded according to a multicast rule in the first table. In some embodiments, the entry point into the first table is dependent on the destination information associated with a copy. The multicast replication engine maintains a LIFO stack and traverses the hierarchical linked list using the LIFO stack by pushing and popping data regarding nodes of the hierarchical linked list as the multicast replication engine traverses the hierarchical linked list. In particular, data regarding a node of the hierarchical linked list is stored in the LIFO stack at each hop across tiers of the hierarchical linked list away from a trunk of the hierarchical linked list, and data regarding a node of the hierarchical linked list is removed from the LIFO stack at each hop across tiers of the hierarchical linked list towards the trunk of the hierarchical linked list. The multicast replication engine replicates the packet according to data associated with each node of the hierarchical linked list.

The replication feature, the mirroring feature and the link switchover feature share overlapping logic. As such, the additional cost to implement each of these features is minimal. Furthermore, the logic for these features is not dispersed on a network chip but instead are implemented using the same hardware, thereby efficiently utilizing the real estate of the network chip. Specifically, the mirroring and link switchover can share the same table and identical pointer following logic, albeit with slightly different boolean variables.

Figure 14:
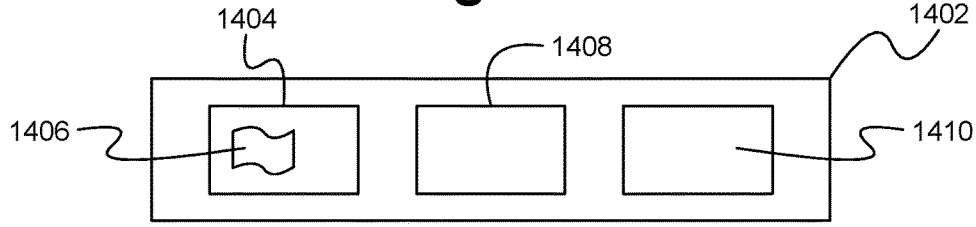
FIG. 14 illustrates a network switch microchip according to some embodiments.

FIG. 14 illustrates a network switch microchip 1402 according to some embodiments. As shown in FIG. 14, the chip 1402 comprises a memory 1404 storing a multicast destination table 1406, a multicast replication engine 1408 and an input port 1410.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A network chip comprising:
    a memory;
    a multicast destination table stored in the memory and including a list of links, wherein the list of links includes a main link and a plurality of alternative links that reach the same destination; and
    a multicast replication engine that implements a switchover feature and replicates a packet according to the list of links, wherein for each of the main link and the plurality of alternative links, the multicast destination table includes an entry having "live" field that indicates whether that link is active.

2. The network chip of claim 1, wherein the switchover feature is network agnostic.

3. The network chip of claim 1, wherein the entry includes a pointer to the next link in the list of links, destination information and a "first live enabled" field.

4. The network chip of claim 3, wherein the destination information indicates at least one port for local mirroring or at least one tunnel for remote mirroring.

5. The network chip of claim 3, wherein the "first live enabled" field indicates whether the switchover feature is enabled.

6. The network chip of claim 1, wherein the links in the list of links are ordered based on a metric.

7. The network chip of claim 3, wherein the multicast destination engine traverses the list of links until the "first live enabled" field and the "live" field of a corresponding entry are enabled.

8. The network chip of claim 3, wherein the packet is replicated when the "first live enabled" field is enabled and the "live" field is enabled.

9. The network chip of claim 1, wherein the multicast destination table is software configurable.

10. The network chip of claim 1, wherein the multicast destination table is kept up to date and maintained by software.

11. A network switch microchip including a memory and a processor configured to receive a packet, traverse a list of links until an enabled link in the list of links is reached, wherein the list of links includes a main link and a plurality of alternative links that reach the same destination and replicate the packet according to data associated with the enabled link in the list of links, wherein the data includes a live bit that indicates that the enabled link is active.

12. The network switch microchip of claim 11, wherein the enabled link is the main link.

13. The network switch microchip of claim 11, wherein the enabled link is one of the plurality of alternative links.

14. The network switch microchip of claim 11, wherein the processor is configured to access a multicast destination table.

15. The network switch microchip of claim 11, wherein each link of the list of links is stored as an entry in the multicast destination table.

16. The network switch microchip of claim 15, wherein the data includes identification information of a corresponding link, destination information, and a pointer to the next link.

17. The network switch microchip of claim 16, wherein the processor is further configured to make a copy of the packet with the destination information.

18. A network switch comprising:
an input port for receiving a packet;
a memory for storing a multicast destination table, wherein the multicast destination table includes a list of links, wherein the list of links includes a main link and a plurality of alternative links that reach the same destination; and
a multicast replication engine that replicates the packet according to data associated with a first enabled link in the list of links, wherein the data includes a live bit that indicates that the enabled link is active.

19. The network switch of claim 18, wherein the first enabled link in the list of links is a link that is active.

20. The network switch of claim 18, wherein the multicast destination table is software configured at initialization.

21. The network switch of claim 18, wherein the multicast destination table is software dynamically configured during runtime.

22. A method of implementing a network switch, the method comprising:
maintaining a multicast destination table in a memory of the network switch;
receiving a packet at an incoming port of the network switch;
deriving an entry point into the multicast destination table, wherein the entry point points to the start of a list of links, wherein the list of links includes a main link and a plurality of alternative links that reach the same destination;
replicating the packet according to data associated with a first enabled link in the list of links;
detecting a link failure at one of links in the list of links; and
updating a respective entry for the failed link in the multicast destination table.

23. The method of claim 22, wherein the first enabled link in the list of links is a link that is active.

24. The method of claim 22, further comprising, prior to the maintaining step, preconfiguring the multicast destination table via software with entries corresponding to the list of links.

25. The method of claim 22, further comprising:
detecting recovery of a failed link in the list of links; and
updating a respective entry for the recovered link in the multicast destination table.

26. The method of claim 22, further comprising performing a switch over in hardware by changing an outgoing interface of the packet in a control path.

27. A method of implementing a multicast replication engine, the method comprising:
receiving a packet with the multicast replication engine on a network switch;
receiving an entry point into a multicast destination table with the multicast replication engine, wherein the entry point points to the start of a list of links, wherein the list of links includes a main link and a plurality of alternative links that reach the same destination;
traversing the list of links with the multicast replication engine until an enabled link in the list of links is reached; and
replicating the packet with the multicast replication engine according to data associated with the enabled link in the list of links, wherein the data includes a live bit that indicates that the enabled link is active.

28. The method of claim 27, wherein each link of the list of links is stored as an entry in the multicast destination table.

29. The method of claim 27, wherein the data includes identification information of a corresponding link, destination information, a pointer to the next link.

30. The method of claim 29, wherein the packet is replicated with the destination information.

* * * * *